(12) United States Patent
Strong et al.

(10) Patent No.: US 9,182,025 B2
(45) Date of Patent: Nov. 10, 2015

(54) TORQUE CONVERTER DAMPER WITH DUAL INPUT

(71) Applicant: SCHAEFFLER TECHNOLOGIES AG & CO. KG, Herzogenaurach (DE)

(72) Inventors: Scott Strong, Wooster, OH (US); Todd Sturgin, Wooster, OH (US)

(73) Assignee: Schaeffler Technologies AG & Co. KG, Herzogenaurach ( * ) Notice: Subject to any disclaimer, the term of this patent is extended or adjusted under 35 U.S.C. 154(b) by 362 days.

(21) Appl. No.: 13/848,409

(22) Filed: Mar. 21, 2013

(65) Prior Publication Data

US 2013/0291528 A1    Nov. 7, 2013

Related U.S. Application Data

(60) Provisional application No. 61/643,592, filed on May 7, 2012.

(51) Int. Cl.
*F16H 45/02* (2006.01)
*F16D 33/18* (2006.01)
*F16H 45/00* (2006.01)

(52) U.S. Cl.
CPC .............. *F16H 45/02* (2013.01); *F16D 33/18* (2013.01); *F16H 2045/002* (2013.01); *F16H 2045/0205* (2013.01); *F16H 2045/0226* (2013.01); *F16H 2045/0284* (2013.01)

(58) Field of Classification Search
CPC .................. F16H 2045/002; F16H 2045/0205; F16H 2045/0226; F16H 2045/0284; F16D 33/18; F16F 15/121; F16F 15/12373; F16F 15/12313
See application file for complete search history.

(56) References Cited

U.S. PATENT DOCUMENTS

| 4,697,417 | A | 10/1987 | Billet et al. | |
|---|---|---|---|---|
| 2007/0017767 | A1* | 1/2007 | Breier | 192/3.51 |
| 2007/0181396 | A1* | 8/2007 | Maienschein et al. | 192/3.29 |
| 2007/0235277 | A1* | 10/2007 | Heuler et al. | 192/3.3 |
| 2008/0257674 | A1* | 10/2008 | Sasse et al. | 192/3.29 |
| 2009/0305847 | A1* | 12/2009 | Klump et al. | 477/86 |
| 2011/0240429 | A1* | 10/2011 | Heuler et al. | 192/3.28 |

FOREIGN PATENT DOCUMENTS

| DE | 102008048030 | * | 3/2010 |
|---|---|---|---|
| DE | 102009050671 | * | 7/2010 |

OTHER PUBLICATIONS

Reik W. et al., Dual Mass Flywheel, 6th LuK Symposium, LuK GmbH & Co. KG, 1998, pp. 69-93.
Middelmann V., et al., The Torque Converter as a System, 6th LuK Symposium, LuK GmbH & Co. KG, 1998, pp. 123-156.

* cited by examiner

*Primary Examiner* — Rodney H Bonck
*Assistant Examiner* — Lillian Nguyen
(74) *Attorney, Agent, or Firm* — Kathryn A. Warner; Kevin L. Parks

(57) ABSTRACT

A damper for a torque converter includes a first clutch arranged for selective engagement with a cover for the torque converter, a first spring, a second spring, and a first plate drivingly engaged with the first spring and the second spring. The damper also includes a second plate and a third plate. The second plate is axially displaceable relative to the first plate, drivingly engaged with one of the first or the second spring, and arranged for fixing to a turbine for the torque converter. The third plate is axially displaceable relative to the first and second plates, fixed to the first clutch, and drivingly engaged with the one of the first or second spring.

20 Claims, 3 Drawing Sheets

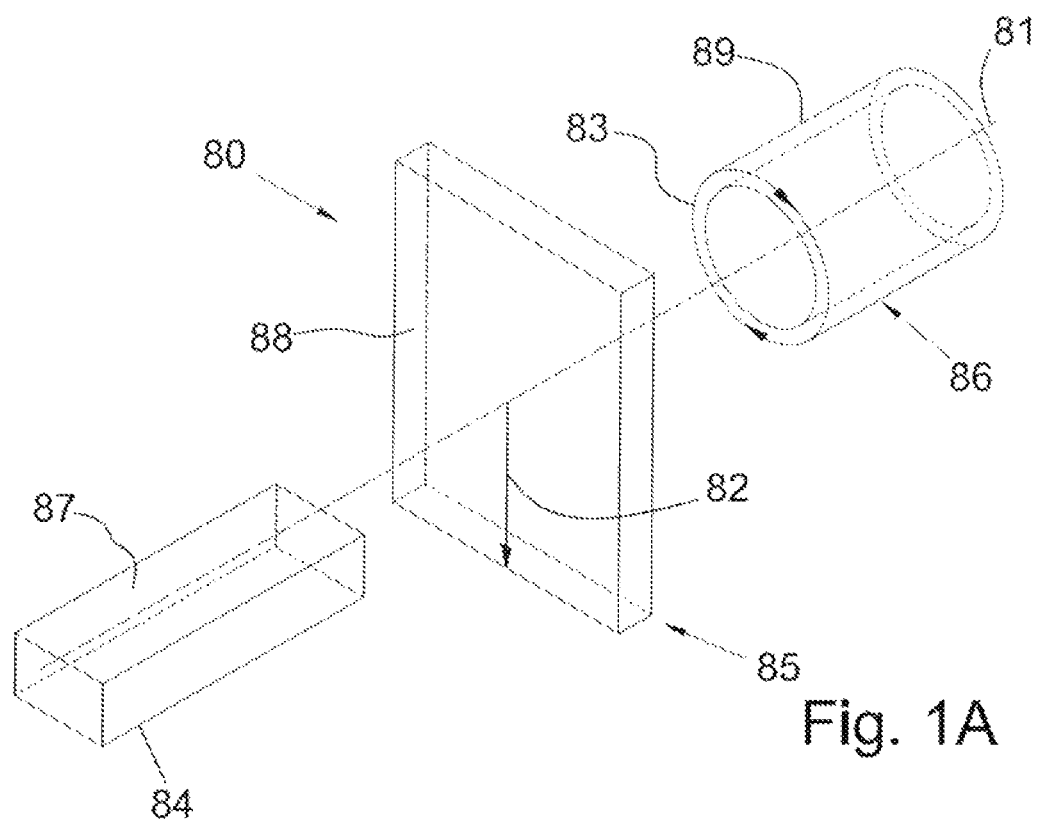
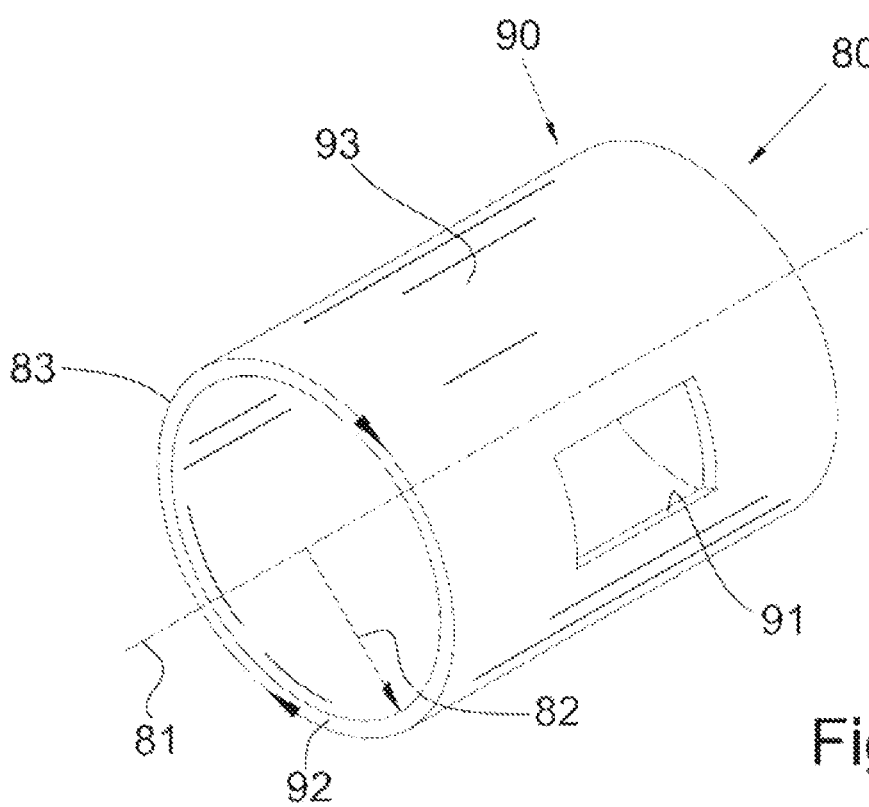

US 9,182,025 B2

TORQUE CONVERTER DAMPER WITH DUAL INPUT

FIELD

The invention relates generally to a torque converter damper, and more specifically to a torque converter damper with dual inputs.

BACKGROUND

Torque converter dampers are known. One example is shown in U.S. Pat. No. 4,697,417 to Billet et al. for a torsional damper with two flanges including at least one area of axial interpenetration between the flanges.

BRIEF SUMMARY

Example aspects broadly comprise a damper for a torque converter including a first clutch arranged for selective engagement with a cover for the torque converter, a first spring, a second spring, and a first plate drivingly engaged with the first spring and the second spring. The damper also includes a second plate and a third plate. The second plate is axially displaceable relative to the first plate, drivingly engaged with one of the first or the second spring, and arranged for fixing to a turbine for the torque converter. The third plate is axially displaceable relative to the first and second plates, fixed to the first clutch, and drivingly engaged with the one of the first or second spring.

In some example embodiments, the damper includes a fourth plate drivingly engaged with the other of the first or second spring and arranged for driving connection with a transmission input shaft. In an example embodiment, the fourth plate includes a cylindrical protrusion and the second plate includes a cylindrical protrusion, disposed radially outside of the fourth plate cylindrical protrusion, for centering the second plate relative to the fourth plate.

In some example embodiments, the first plate is disposed axially between the second and third plates. In some example embodiments, the third plate includes an outer diameter, the second plate includes a toroidal portion for receiving the first spring, the toroidal portion includes a distal end with an inner diameter, and the distal end inner diameter is greater than the third plate outer diameter. In an example embodiment, the first plate includes an outer diameter and the distal end inner diameter is greater than the first plate outer diameter.

In some example embodiments, the first clutch includes a first piston plate and the first plate includes a first cover plate in contact with the first piston plate and a second cover plate in contact with the second plate. In an example embodiment, the third plate is fixed to the first piston plate. In an example embodiment, the damper includes a second clutch with a second piston plate and the first clutch includes a first piston plate sealingly engaged with the second piston plate.

Other example aspects broadly comprise a torque converter including a turbine, a first clutch including a first piston plate, and a second clutch including a second piston plate sealed to the first piston plate. The torque converter also includes a first plurality of springs, a second plurality of springs disposed radially inside of the first plurality of springs, a spring retainer, and first and second plates. The spring retainer is fixed to the turbine and includes a crimped portion that is drivingly engaged with the first plurality of springs. The first plate is drivingly engaged with the first and second pluralities of springs. The second plate is axially displaceable relative to the first plate, fixedly attached to the second piston plate, and drivingly engaged with the first plurality of springs.

In an example embodiment, the first clutch is disposed radially outside of the second clutch. In an example embodiment, the first plate includes first and second cover plates in contact with the second plate and the spring retainer, respectively. In an example embodiment, the first plurality of springs comprise arcuately-formed coil springs and the second plurality of springs comprise straight coil springs. In an example embodiment, the torque converter includes a third plate drivingly engaged with the second plurality of springs. The third plate includes a spline arranged for driving connection to a transmission input shaft.

In some example embodiments, the first plate includes a first radial tab for driving engagement with the first plurality of springs. The first radial tab includes an outer diameter. The spring retainer includes a toroidal receptacle for receiving the first plurality of springs. The toroidal receptacle includes a distal end with a diameter. The first radial tab outer diameter is less than the toroidal receptacle diameter. In an example embodiment, the second plate includes a second radial tab for driving engagement with the second plurality of springs. The second radial tab includes an outer diameter. The second radial tab outer diameter is less than the toroidal receptacle diameter.

BRIEF DESCRIPTION OF THE DRAWINGS

The nature and mode of operation of the present invention will now be more fully described in the following detailed description taken with the accompanying drawing figures, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application;

DETAILED DESCRIPTION

Figure 2:
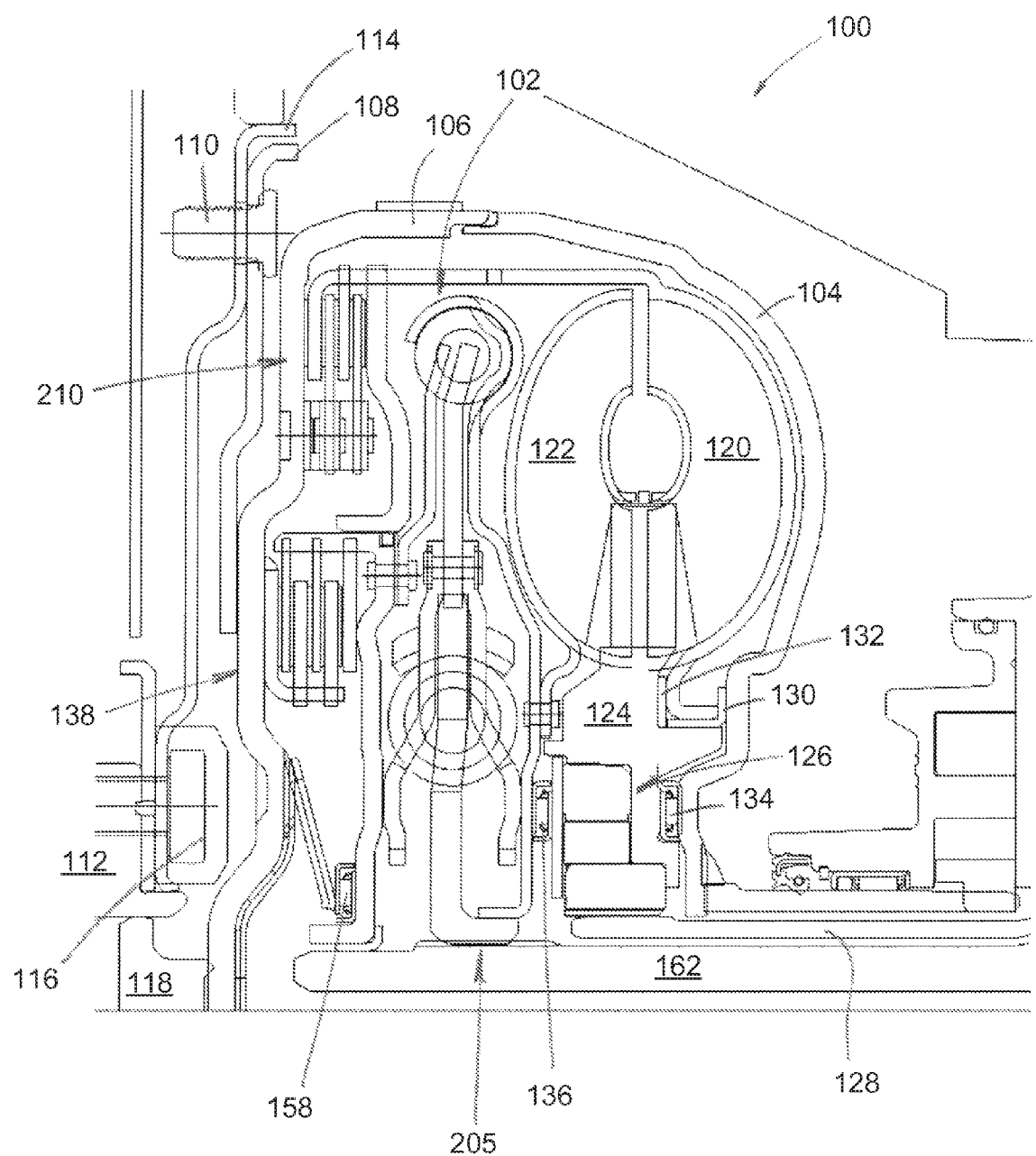
FIG. 2 is a top half cross-section view a torque converter including a damper with dual input according to an example aspect; and, FIG. 3 is a detail view of the damper with dual input of FIG. 2.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 3:
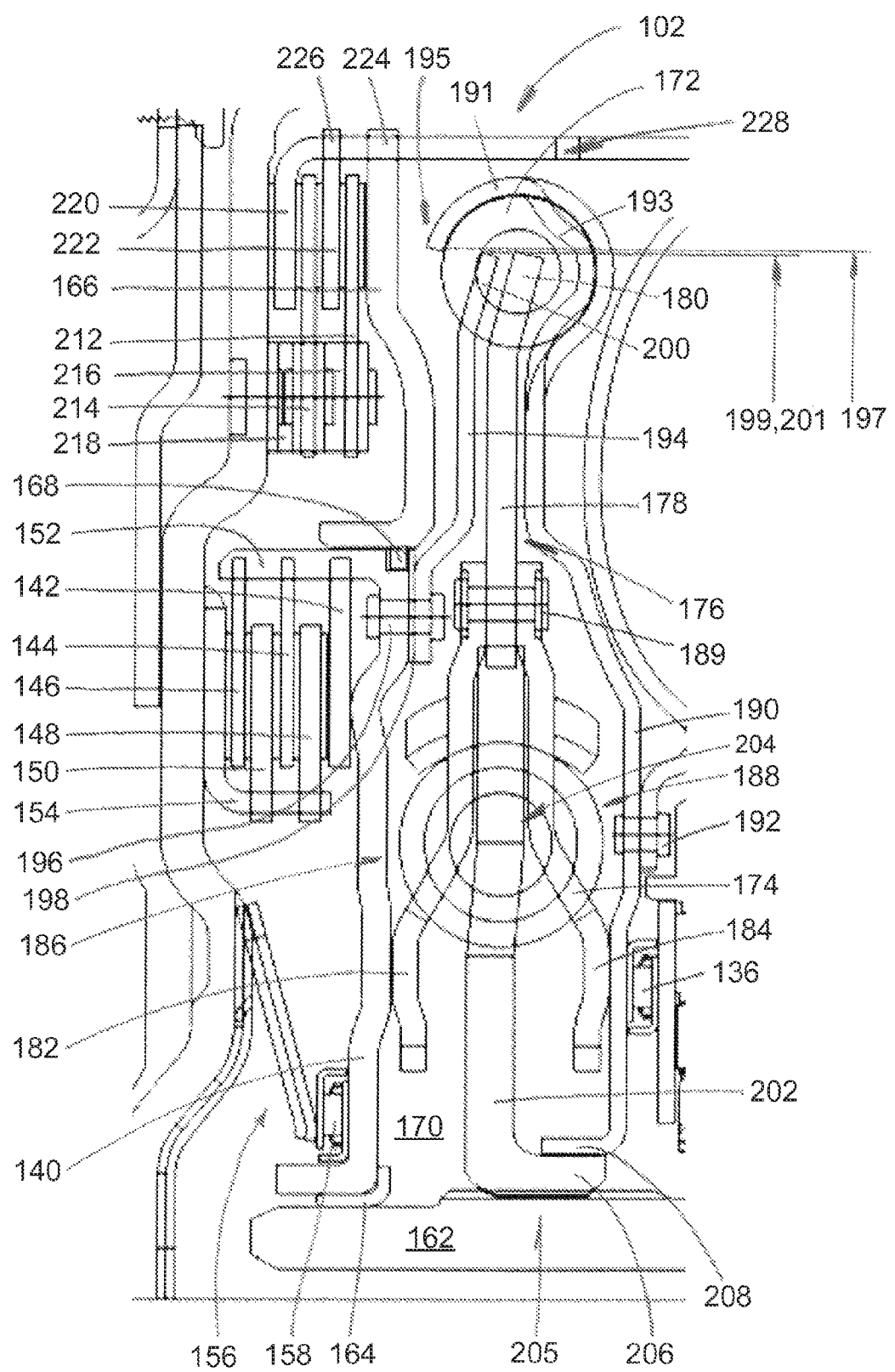

The following description is made with reference to FIGS. 2 and 3. FIG. 2 is a top half cross-section view torque converter 100 including damper 102 with dual input according to an example aspect. FIG. 3 is a detail view of damper 102 with dual input. Torque converter 100 includes outer shell 104 fixed to cover 106 by welding, for example. Cover 106 includes drive plate 108 with studs 110 for fixing the torque converter to engine crankshaft 112 by way of flexplate 114 and bolts 116. Cover pilot 118 centers the torque converter with respect to the crankshaft.

Converter 100 includes impeller 120, turbine 122, and stator 124 with one-way clutch assembly 126. Clutch 126 is drivingly engaged with stator shaft 128. In an example embodiment, the impeller is positioned on the stator by bushings 130 and 132. Stator 124 is axially positioned in the converter by bearings 134 and 136.

Damper 102 includes clutch 138. Clutch 138 is arranged for selective engagement with cover 106. Clutch 138 includes piston 140, friction plates 142, 144, and 146, and clutch plates 148 and 150. Piston 140 includes axial protrusions 152 drivingly engaged with the friction plates, and cover 106 includes carrier 154 drivingly engaged with the clutch plates. Axial force from springs 156 acting through bearing 158 urges piston 140 away from cover 106. In an example embodiment, springs 156 are Belleville springs. Cover 106 may include flow grooves 160 to facilitate fluid flow past springs 156. Piston 140 is sealed to input shaft 162 at bushing 164, and to piston 166 at seal 168 so that, for a force from a hydraulic pressure in chamber 170 acting on piston 140 that is greater than the force of springs 156, piston 140 is displaced towards the cover to clamp the friction plates and clutch plates and engage the clutch.

Damper 102 also includes springs 172 and 174, and plates 176, 190, and 194. Plate 176 is disposed axially between plates 190 and 194. In an example embodiment, springs 172 are arcuately-formed coil springs and springs 174 are straight coil springs. Springs 172 and 174 may include pairs of concentrically arranged coil springs. In an example embodiment, springs 172 and 174 may include end caps (not shown). Plate 176 is drivingly engaged with springs 172 and 174. Plate 176 includes flange 178 with radial tab 180 engaged with springs 172, and cover plates 182 and 184 including respective spring windows, or cutouts, 186 and 188 engaged with springs 174. Flange 178 is fixed to cover plates 182 and 184 by rivet 189.

Plate 190 is axially displaceable relative to plate 176. That is, plates 176 and 190 are not axially fixed to one another. Otherwise stated, prior to assembly of converter 100, plates 176 and 190 are separate components that are placed together to form portions of damper 102, but, upon disassembly of converter 100, individual components 176 and 190 can be separated because there are no fasteners or welds fixing the components to one another. Furthermore, plate 190 is particularly configured so that plate 176 may be easily assembled and removed from the damper. Plate 190 is drivingly engaged with spring 172 and arranged for fixing to turbine 122. That is, plate 190 and turbine 122 include mating apertures for receiving rivet 192 to fix the two components together.

Plate 194 is axially displaceable relative to plates 176 and 190. That is, plate 194 is not axially fixed to plate 176 or plate 190 so that the plates are arranged in converter 100 in a manner similar to the discussion of plates 176 and 190 above. Plate 194 is fixed to clutch 138. Specifically, plate 194 is fixed to piston 140 at rivet 196. Clip seal plate 198 is fixed between piston 140 and plate 194 to retain seal 168. Plate 194 includes radial tab 200 drivingly engaged with spring 172.

Plate, or spring retainer, 190 includes toroidal portion, or toroidal receptacle, 191 for receiving spring 172 and crimped portion 193 drivingly engaged with spring 172. That is, the toroidal portion includes a circular section with a diameter slightly larger than an outer diameter of spring 172 so that the spring is radially retained by plate 190 and circumferentially slideable within toroidal portion 191 until contacting crimped portion 193. The toroidal portion includes distal end 195 for partially restricting axial movement of the spring to keep the spring from dislodging from plate 190. Distal end 195 includes inner diameter 197 and plate 194 includes outer diameter 199 for tab 200. Inner diameter 197 is greater than outer diameter 199. In an example embodiment, plate 176 includes outer diameter 201 for tab 180 and inner diameter 197 is greater than outer diameter 201.

In an example embodiment, damper 102 includes plate 202. Plate 202 is drivingly engaged with spring 174 at spring window 204 and arranged for driving connection with transmission input shaft 162. That is, plate 202 and shaft 162 include complementary splines 205 arranged for driving connection so that torque in plate 202 is transmitted to shaft 162. In an example embodiment, plate 202 includes cylindrical protrusion 206 and plate 190 includes cylindrical protrusion 208. Protrusion 208 is disposed radially outside of cylindrical protrusion 206. Protrusions 206 and 208 are for centering plate 190 relative to plate 202. Thus, plate 190 is radially positioned on input shaft 162 by splines 205 and contact between the cylindrical protrusions. Plate 182 contacts piston 140 and plate 190 contacts plate 184, forming a thrust path from the turbine to the piston and permitting free rotation of plate 202.

In an example embodiment, damper 102 includes clutch 210 disposed radially outside of clutch 138. Clutch 210 includes friction plates 212 and 214 rotationally fixed to cover 106 via leaf springs 216 and 218, respectively. Clutch 210 also includes piston 166 and clutch plate 220 rotationally fixed to piston 166 and clutch plate 222 at respective radial tabs 224 and 226. Plate 220 is rotationally fixed to impeller 120 at axial tab connection 228. Clutch 210 is engaged by pressure in chamber 170 similar to clutch 138 above, although clutch 210 does not include springs 156 so clutch 210 may engage before clutch 138 resulting in a sequential clutch engagement.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A damper for a torque converter comprising:
 a first clutch arranged for selective engagement with a cover for the torque converter and including a first piston plate;
 a first spring;
 a second spring;
 a first plate, drivingly engaged with the first spring and the second spring, and including:
  a first cover plate in contact with the first piston plate; and,
  a second cover plate; a second plate:
 axially displaceable relative to the first plate;
 drivingly engaged with one of the first or the second spring;
 arranged for fixing to a turbine for the torque converter; and,
 in contact with the second cover plate; and, a third plate:
 axially displaceable relative to the first and second plates;
 fixed to the first clutch; and,
 drivingly engaged with the one of the first or second spring.

2. The damper of claim 1 further comprising:
 a fourth plate drivingly engaged with the other of the first or second spring and arranged for driving connection with a transmission input shaft.

3. The damper of claim 2 wherein the fourth plate comprises a cylindrical protrusion and the second plate includes a cylindrical protrusion, disposed radially outside of the fourth plate cylindrical protrusion, for centering the second plate relative to the fourth plate.

4. The damper of claim 1 wherein the first plate is disposed axially between the second and third plates.

5. The damper of claim 4 wherein:
 the third plate includes an outer diameter;
 the second plate includes a toroidal portion for receiving the first spring;
 the toroidal portion includes a distal end with an inner diameter; and,
 the distal end inner diameter is greater than than the third plate outer diameter.

6. The damper of claim 5 wherein:
 the first plate includes an outer diameter; and,
 the distal end inner diameter is greater than the first plate outer diameter.

7. The damper of claim 1 wherein the third plate is fixed to the first piston plate.

8. The damper of claim 1 further comprising a second clutch with a second piston plate, wherein the first clutch includes a first piston plate sealingly engaged with the second piston plate.

9. A torque converter comprising:
 a turbine;
 a first clutch including a first piston plate;
 a second clutch including a second piston plate sealed to the first piston plate;
 a first plurality of springs;
 a second plurality of springs disposed radially inside of the first plurality of springs;
 a spring retainer, fixed to the turbine and including a crimped portion that is drivingly engaged with the first plurality of springs;
 a first plate drivingly engaged with the first and second pluralities of springs;
 a second plate, axially displaceable relative to the first plate, fixedly attached to the second piston plate, and drivingly engaged with the first plurality of springs.

10. The torque converter of claim 9 wherein the first clutch is disposed radially outside of the second clutch.

11. The torque converter of claim 9 wherein the first plate includes first and second cover plates in contact with the second plate and the spring retainer, respectively.

12. The torque converter of claim 9 wherein the first plurality of springs comprise arcuately-formed coil springs and the second plurality of springs comprise straight coil springs.

13. The torque converter of claim 9 further comprising a third plate drivingly engaged with the second plurality of springs and comprising a spline arranged for driving connection to a transmission input shaft.

14. The torque converter of claim 9 wherein:
 the first plate includes a first radial tab for driving engagement with the first plurality of springs;
 the first radial tab includes an outer diameter;
 the spring retainer includes a toroidal receptacle for receiving the first plurality of springs;
 the toroidal receptacle includes a distal end with a diameter; and,
 the first radial tab outer diameter is less than the toroidal receptacle diameter.

15. The torque converter of claim 14 wherein:
 the second plate includes a second radial tab for driving engagement with the second plurality of springs;
 the second radial tab includes an outer diameter; and,
 the second radial tab outer diameter is less than the toroidal receptacle diameter.

16. A damper for a torque converter comprising:
 a first clutch arranged for selective engagement with a cover for the torque converter;
 a first spring;
 a second spring;
 a first plate drivingly engaged with the first spring and the second spring;
 a second plate:
  axially displaceable relative to the first plate;
  drivingly engaged with one of the first or the second spring; and,
  arranged for fixing to a turbine for the torque converter;
 a third plate:
  axially displaceable relative to the first and second plates;
  fixed to the first clutch; and,
  drivingly engaged with the one of the first or second spring; and, a fourth plate:
  drivingly engaged with the other of the first or second spring; and,
  arranged for driving connection with a transmission input shaft; and, wherein the fourth plate includes a cylindrical protrusion and the second plate includes a cylindrical protrusion, disposed radially outside of the fourth plate cylindrical protrusion, for centering the second plate relative to the fourth plate.

17. The damper of claim 16 wherein the first plate is disposed axially between the second and third plates.

18. The damper of claim 17 wherein:
the third plate includes an outer diameter;
the second plate includes a toroidal portion for receiving the first spring;
the toroidal portion includes a distal end with an inner diameter; and,
the distal end inner diameter is greater than than the third plate outer diameter.

19. The damper of claim 18 wherein:
the first plate includes an outer diameter; and,
the distal end inner diameter is greater than the first plate outer diameter.

20. The damper of claim 16 wherein the third plate is fixed to the first piston plate.

\* \* \* \* \*